United States Patent [19]
Tidwell et al.

[11] 3,898,135
[45] Aug. 5, 1975

[54] EXTRACTIVE DISTILLATION OF $C_4$ HYDROCARBONS USING A THREE COMPONENT SOLVENT SYSTEM

[75] Inventors: Calvin M. Tidwell, Bellaire; Val G. Henneberg, Houston, both of Tex.

[73] Assignee: Petro-Tex Chemical Corporation, Houston, Tex.

[22] Filed: Sept. 28, 1973

[21] Appl. No.: 401,738

Related U.S. Application Data

[63] Continuation-in-part of Ser. No. 165,587, July 23, 1971, abandoned.

[52] U.S. Cl. .......................... 203/9; 203/54; 203/58; 203/60; 260/666.5; 260/677 A; 260/681.5
[51] Int. Cl. ........................... B01d 3/40; C07c 7/00
[58] Field of Search ............ 203/54, 58, 60, 63, 51, 203/6–9; 260/681.5, 666.5, 677 A

[56] References Cited
UNITED STATES PATENTS

| | | | |
|---|---|---|---|
| 3,309,412 | 3/1967 | Sukuragi et al. | 203/9 |
| 3,405,189 | 10/1968 | Sukuragi et al. | 203/9 |
| 3,436,437 | 4/1969 | Asaka et al. | 260/681.5 R |
| 3,436,438 | 4/1969 | Takao et al. | 203/9 |
| 3,441,484 | 4/1969 | Teaney | 203/96 |
| 3,515,762 | 6/1970 | Koide et al. | 203/9 |
| 3,681,202 | 8/1972 | Funkhouser | 203/60 |

*Primary Examiner*—Wilbur L. Bascomb, Jr.
*Attorney, Agent, or Firm*—N. Elton Dry; Kenneth H. Johnson

[57] ABSTRACT

An improvement in separation of closely boiling hydrocarbons by extractive distillation with alkoxynitrile wherein equipment plugging and fouling polymer is solubilized by the presence of small amounts of furfural.

10 Claims, No Drawings

EXTRACTIVE DISTILLATION OF C₄ HYDROCARBONS USING A THREE COMPONENT SOLVENT SYSTEM

CROSS REFERENCES

This application is a continuation in part of Ser. No. 165,587 filed July 23, 1971 now abandoned.

BACKGROUND OF THE INVENTION

This invention relates to an improvement in extractive distillation processes for the separation and purification of hydrocarbons from mixtures thereof, and relates more specifically to an improved solvent for such extractive distillations.

Various methods have been proposed for effecting the separation or purification of hydrocarbon mixtures containing components of different degrees of saturation which are difficult to separate by ordinary fractionation. Of these methods the most practical from the standpoint of large-scale operation are those which involve contacting the mixture with a solvent, which has a preferential solubility for one or more of the components thereof. Improved results are attained in many cases by distilling the mixture in the presence of a selective solvent. This method is commonly referred to as extractive distillation. While susceptible to some variation, extractive distillation processes are, in general, executed by causing the solvent to flow down the distillation column, as the distillation proceeds and as vapors ascend from the kettle at the bottom of the column. The dissolved component may be removed from the fat solvent by distillation, reduction of pressure, or by any other suitable means to produce a lean solvent which may be recirculated.

One example of a separation by extractive distillation is in the separation of butadiene-1,3 from other hydrocarbons. Extractive distillation processes have been extensively employed for the separation and purifcation of C₄ hydrocarbons which are difficultly separated by straight fractional distillation, particularly the separation of butene-2 from n-butane and the separation of butadiene-1,3 from butene-1 and n-butane. In solvent extractive distillation, at least one hydrocarbon is removed from the system dissolved in the solvent and at least one other hydrocarbon passes from the upper area of the extractive distillation zone as unabsorbed overhead, normally in a gaseous state.

In the dehydrogenation of n-butane, a mixture of butene-1, n-butane, butadiene-1,3 and butene-2 (both low and high boiling isomers) is obtained. In commercial operation it is desirable to isolate and segregate the different components of this mixture. Butene-1 can be separated from the mixture by fractional distillation, but, for example, the separation of butene-2 from n-butane is accomplished readily only by solvent extractive distillation.

When butylenes are catalytically dehydrogenated, after removal of light gases such as hydrogen, methane, ethylene, propylene and the like, a mixture of C₄ hydrocarbons is obtained which normally consists of butene-1, butene-2 (both low and high boiling isomers) and butadiene-1,3 with some n-butane and isobutylene. Complete separation of these components by fractional distillation is not possible because of the close boiling points. Also, n-butane forms an azeotrope with butadiene-1,3. However, some of the components of the described mixture of C₄ hydrocarbons are readily separated by solvent extractive distillation, and in such a process butene-1, n-butane, isobutylene and some butene-2 are removed as overhead gas in an extractive distillation column, and the butadiene-1,3 and a portion of the butene-2 are removed dissolved in the solvent employed in the extractive distillation. The butadiene-1,3 may be subsequently separated from the butene-2 by straight fractional distillation after stripping from the solvent.

In extractive distillation processes for the separation of mixtures of C₄ hydrocarbons, which extractive distillation processes are well-known to those skilled in the art, a number of solvents may be employed. The most useful solvents are polar organic materials which are soluble to some extent in water. Such materials include, for example, furfural, acetone, phenol, dimethyl formamide, dimethylamine, dioxane, 3-methoxypropionitrile and the like.

Furfural is a known standard solvent for extractive distillation but furfural has some disadvantages as a solvent. For example, furfural has been reported to be corrosive and to have a characteristic of instability in extractive distillation processes. Also, under certain conditions furfural reacts with butadiene to form codimers and also may homopolymerize to form polymers. These reactions result in the loss of both furfural and butadiene and necessitate methods for removal of these reaction products. Furthermore, it is a continuing objective of these processes to provide solvents which have greater selectivity for the unsaturated hydrocarbons such as butadiene and also to provide solvents which can separate at lower solvent to hydrocarbon feed ratios and at lower reboiler temperatures in order to realize savings in utilities and to reduce unsaturated dimer formation. Thus, although furfural has been extensively utilized it has these significant drawbacks.

The use of alkoxy nitriles as extractive distillation solvents have been suggested, for example, in the work done for the Reconstruction Finance Corporation Office of Synthetic Rubber*. The use of alkoxynitriles has also been reported in U.S. Pat. Nos. 3,372,109; 3,436,437 and 3,681,202. The alkoxynitriles are superior in some respects to furfural, for example, in that greater selectivity can be achieved. It was also thought that the use of alkoxynitriles would avoid the problems associated with furfural reactivity with itself to form homopolymers or the problem of butadiene polymerization in the presence of furfural. However, when attempts were made to utilize alkoxynitrile serious problems resulted and instead of achieving reduced fouling and plugging, the problems associated with alkoxynitriles were even greater than with the use of furfural. It was found that a rubbery type polymer deposited on the walls of the extractive distillation equipment utilizing alkoxynitriles. Thus, it was not possible to utilize the advantages of alkoxynitriles because of the major problems which were associated with fouling and plugging of equipment.

*See Summary of Research for Reconstruction Finance Corporation Office of Synthetic Rubber, RUR SR-281, presented at Butadiene-Styrene Plants Operating Committee Meeting, New Orleans, La., Oct. 28 and 29, 1953.

SUMMARY OF THE INVENTION

According to this invention it has been discovered that improved extractive distillation processes result when a solvent comprising a major amount of alkoxynitrile and a minor amount of furfural is used.

The process of the invention is useful in the separation of mixtures of hydrocarbons in varying degrees of unsaturation by a process of extractive distillation with a solvent comprising alkoxynitrile and furfural to reduce fouling. For example, from about 0.5 to about 50 percent by weight of furfural based on the total weight of solvent may be employed with a preferred range being from about 1 percent to 20 percent furfural. The effect of the furfural on the alkoxynitrile system can be detrimental, that is, furfural is not as good an extractive distillation solvent in regard to capacity and selectivity as the alkoxynitriles. Thus, increasing quantities of furfural will cause a gradual, proportional decrease in capacity and selectivity of the solvent and it is the purpose of this invention to obtain the benefits of furfural in the system with the smallest amount of furfural possible. Water may also preferably be present in a solvent with a preferred range being from 1 to 20 or 25 weight percent of water based on the total weight of solvent. A preferred solvent comprises by weight from 70 or 80 to 98 percent of alkoxynitrile, from 0.5 to 25 percent furfural, and from 1 to 20 or 25 percent water. A particularly preferred range of furfural is from 1 percent to 10 percent.

The present process is especially valuable in the separation of narrow boiling hydrocarbon mixtures such as the separation of more unsaturated hydrocarbons from less unsaturated hydrocarbons. For instance, diolefins may be separated from mono-olefins or paraffins and paraffins may be separated from mono-olefins. Separations suitable for extractive distillation process are well known to those skilled in the art. Generally, the hydrocarbon mixtures will have up to 6 or 7 carbon atoms with a preferred mixture to be separated having from 3 to 5 carbon atoms and this invention is especially adaptable to the separation of hydrocarbons having 4 carbon atoms.

Although one of the objectives of avoiding furfural was to avoid polymer formation associated with the use of furfural as a solvent, it has quite unexpectedly been discovered according to this invention that furfural used in combination with alkoxynitriles significantly reduces the polymer and fouling problem associated with the use of alkoxynitrile. It has been discovered that the incorporation of even a minor portion of furfural with alkoxynitrile significantly improves the alkoxynitrile and the combination solvent can be operated with relatively little polymer and plugging problem. The exact mechanism of the combined furfural - alkokynitrile is not fully understood. Applicants do not wish to be limited to any theory of the invention; however, it has been determined that the fouling is principally the result of the formation of polybutadiene polymer in the alkoxynitrile system. It would appear that the furfural alone or in some combination with the other components present, provides a highly selective solubilization of the polybutadiene polymer.

This is an expedient which allows the use of the alkoxynitrile system with its improved separative powers. The solubilized polybutadiene is moved out of the extractive distillation tower where its presence on the trays can totally shut down a tower to a point where it can be knocked out of solution and disposed of more conveniently. In other words, the formation of the polybutadiene is not inhibited but the problem it presents is moved to a point where it can be handled. At any rate, it was quite unexpected that a compound which itself was known to facilitate polymer formation would actually serve to dramatically decrease fouling and plugging.

DETAILED DESCRIPTION OF INVENTION AND PREFERRED EMBODIMENTS

The alkoxynitriles are compounds of the formula $R_1—O—R_2—CN$ where $R_1$ and $R_2$ are straight or branched chain alkyl radicals of 1 to 3 carbon atoms but may contain up to 5 carbon atoms. Best results have been obtained with alkoxynitriles wherein $R_1$ and $R_2$ are straight chain. Preferred alkoxynitriles are such as 3-methoxyacetonitrile; 3-ethoxyacetonitrile; 3-methoxybutyronitrile; 4-ethoxybutyronitrile and 4-propoxybutyronitrile and mixtures thereof. Especially preferred are 3-ethoxypropionitrile and 3-methoxypropionitrile. Processes of extractive distillation are well known in the art such as disclosed in U.S. Pat. Nos. 2,549,586; 3,026,253 and 3,372,109 and in Perry's Chemical Engineer's Handbook, 3rd. edition, McGraw-Hill, in the section beginning at page 629 and these references are incorporated by reference. The design and selection of equipment can be determined by those skilled in the art and any conventional extractive distillation equipment may be used such as baffle columns, bubble trays, packed columns and so forth. The number of theoretical plates can be calculated by known methods. Generally, the feed is introduced into the column near the middle of the column and the solvent is introduced above the point of entrance of the feed. Temperatures may be varied particularly depending upon the hydrocarbon mixture to be separated and the particular compositions of the solvent but ordinarily temperatures between 0°C to 175°C or about 200°C will be employed. One preferred method is to separate at a temperature substantially below the boiling point of the solvent but slightly above the condensation temperature of the most readily condensable constituent of the mixture at the existing pressure with the feed mixture being introduced as a vapor. The pressure in the column may be atmospheric, subatmospheric or superatmospheric but there are advantages in separating at least at atmospheric pressure or greater particularly when the mixture to be separated is made up of normally gaseous components. However, in certain cases as where the spread between the effective distillation temperatures of the components to be separated in the solvent is greatest at subatmospheric pressure it may be advantageous to separate at a reduced pressure even though there may be an additional expense occasioned by the use of refrigerant. Pressures within the range of from atmospheric to 200 p.s.i.g. illustrate typical but non-limiting pressure ranges. The amount of solvent employed may be varied widely but there are certain optimum ratios such as from 0.5 : 1 to about 20 : 1 ratio of solvent to feed.

The new solvents of this invention are useful as new compositions of matter and can be used as solvents such as for the separation of hydrocarbons of different degrees of unsaturation in processes other than extractive distillation processes.

The following examples are illustrative only and are not intended to limit the invention. All percentages are by weight unless expressed otherwise. Examples 1 and 4 are comparative examples to illustrate the problems associated with the prior art use of alkoxynitriles in the absence of furfural.

EXAMPLE 1

The problems associated with extractive distillation using alkoxynitrile solvents is illustrated by this Example. A $C_4$ hydrocarbon stream containing about 29 percent butadiene, 33 percent butene-1, 26 percent n-butene-2, 6 percent n-butane, and traces of vinyl acetylene is extractively distilled to separate butadiene-1,3 therefrom. The hydrocarbon stream is vaporized and introduced into the center of the effective extractive distillation zone of an extractive distillation column of 100 trays. To the extractive distillation column, at the 8th tray from the top of said column, a solvent of 94 weight percent 3-methoxypropionitrile, (MOP) and 6 percent water is introduced at a temperature of about 120°F. The column is operated under conditions such that 760 parts per hour of condensed overhead is obtained and 450 parts per hour of this overhead are returned as reflux to said column and 310 parts per hour of the condensate are recycled to the process upstream from the extractive distillation column. The butadiene-1,3 and some of the butene-2 are removed from the extractive distillation column dissolved in the solvent, are subsequently stripped from the solvent, and fractionally distilled to provide butadiene-1,3. However, the column starts plugging and fouling and on shut down it is discovered that a rubbery polymer has been deposited on the surface of the equipment.

EXAMPLE 2

To illustrate this invention Example 1 is repeated with the exception that the solvent is made up of 89 parts 3-methoxypropionitrile, 6 parts water and 5 parts furfural. Under these conditions the column is operated with much reduced fouling and plugging.

EXAMPLE 3

1800 g. of a solvent consisting of 93 parts 3-methoxypropionitrile, 2 parts furfural and 5 parts water is charged to a system consisting of a steam jacketed hold pot of 840 ml. capacity, discharging through a transfer line and 100 p.s.i.g. pressure relief valve into a 1730 ml. capacity steam jacketed stripping pot equipped with 670 ml. capacity packed demisting column connected to a cooling apparatus for liquifying and separating hydrocarbon overhead vapors under 65 p.s.i.g. pressure and also a solvent return line equipped with a solvent cooler filter and metering pump discharging into the hold pot. The two pots are heated to about 150° – 175°C. and solvent is circulated through the system at the rate of 18 ml. per minute. A hydrocarbon stream of 6% n-butane, 12% butene-1, 24% butene-2 and 58% butadiene-1,3 is fed to the hold pot by a second metering pump at the rate of 3 ml. per minute. The volume of the hold pot and rates of feed into this pot are set to simulate the holdup time in a conventional extractive distillation process. The fat solvent is flashed through the pressure relief valve into the stripper pot and the demisted hydrocarbon vapors collected overhead. A perforated disc is inserted in the stripper solvent stream at this point to add in coalescing and collecting any insoluble polymer formed in the hold pot. Approximately 500 g. of filtered circulating solvent is withdrawn from the system each day and an equal amount of fresh solvent recharged. The test run is continued until about 18 lbs. of hydrocarbon has been fed through the system. At the end of the run the apparatus is disassempled and lines, pots, test disc, etc. examined for evidence of polymer deposition. None is found at any point in the system. 10 ml. of the combined filtered circulating solvent is dried to constant weight in an aluminum dish on a hot plate with a surface temperature of 220°C. The residue, termed soluble nonvolatile residue, is 2.11 percent.

EXAMPLE 4

To illustrate the problems associated with alkoxynitriles without furfural an example is run using the same equipment as Example 3.

The solvent consisted of 95 parts 3-methoxypropionitrile and 5 parts water. The system had to be shut down because of stoppages after about one-third of the hydrocarbon had been fed. It was found on disassembling the apparatus that the walls of both pots are coated below the liquid levels with a layer of gummy rubber. This same material is also deposited in the pressure relief valve, on the test disc and on the circulating solvent filters. The pyrolysis pattern of the gummy rubber precipitated from the circulating solvent is very similar to that of linear polybutadiene rubber. The nonvolatile residue is .09 percent.

EXAMPLE 5

A hydrocarbon mixture of n-butene-1, cis-butene-2, trans-butene-2 and n-butane is extractively distilled to separate the more unsaturated compounds using a solvent of 70% 3-ethoxypropionitrile, 5% water and 25% furfural with good results in regard to fouling and plugging.

EXAMPLES 6 – 9

This series of Examples demonstrates that the furfural does not act as an inhibitor but rather as a surprising solubilizer for the polybutadiene formed during the extractive distillation. The general scheme was to store a butadiene-rich hydrocarbon stream dissolved in MOP-$H_2O$ and MOP furfural — $H_2O$ solvents in a water bath at 55°–60°C. for 250 – 300 hours and following the course of polymer formation visually. At the end of the test, nonvolatile soluble residues (NVSR)[1] and total nonvolatile residues (NVR)[2] were determined on each solvent system. The hydrocarbon used contained approximately 10 percent n-butane, 40 percent mixed n-butenes, and 50 percent butadiene. The amounts of components and the results are shown in Table I.

([1]NVSR — 5.0 ml of the stripped (bled to atmospheric pressure and flashed to 50 mm) solvent from a test run is withdrawn in a glass syringe through a 22 gauge needle. (Experience over the past two years has demonstrated that a 22 gauge needle will exclude weighable quantities of insoluble matter present in the sample.) The sample is weighed by difference into a tared weighing dish which has been previously washed in acetone and dried at 150°C. The sample is flashed on a hot plate having a surface temperature of 210°–230°C, held for an additional 3 minutes after the last drop of liquid disappears, cooled and the weight of NVSR per total test (47.00 gms solvent weight) calculated. This analysis was made in duplicate.

[2]NVR — The remaining solvent in one of the NVSR runs was transferred in 5 ml increments to the matching weighing dish through a 22 gauge needle and evaporated nearly to dryness after each addition. The bottle was rinsed with two 3 ml portions of spectro-grade acetone, and washings transferred to the weighing dish and the dish taken to dryness by the NVSR procedure. The bottle was dried at 150°C and both the insolubles and the total NVR determined. The NVR from a 50.0 gm sample of the hydrocarbon used in the test program weighed 0.0004 gms or less than 0.0002 gms per charge. This weight is not great enough to be of any significance.)

TABLE 1

| | Example 6 | Example 7 | Example 8 | Example 9 (control) |
|---|---|---|---|---|
| | 15.6 g hydrocarbon 95.0 wt. % MOP 47.0 g 5.0 wt % $H_2O$ | 15.6 g hydrocarbon 85.5 wt % MOP 47.0 g 5.0 wt % $H_2O$ 9.5 wt % furfural | .0313 g n-nitro-sophenyl hydroxylamine (NPH) inhibitor 15.6 g hydrocarbon 85.5 wt % MOP 47.0 g 5.0 wt % $H_2O$ 9.5 wt % furfural | no hydrocarbon 85.5 wt % MOP 47.0 g 5.0 wt % $H_2O$ 9.5 wt % furfural |
| After 120 hours: | Slight haze; slight ring of clear rubber forming at vapor-liquid interface; clear to light straw color. | Slight haze, no visible precipitate; light tan color | Dark tan; clear; no visible precipitate; no color change in color from first observation at 20 hours | Light tan; clear. |
| After 281 hours, while still hot: | Heavy haze; easily visible ring of rubber formed at vapor-liquid interface; light straw color. | Moderate haze, very slight ring of polymer in one bottle at vapor-liquid interface light tan color. | No change from previous observation. | No change from previous observation. |
| After 281 hours plus 24 hours at room temp.: | Moderate haze; no change in ring of rubber; creamy emulsion and about 1 ml of water in bottom of bottles; no change in color. | Moderate haze; more definite ring of rubber formed at vapor-liquid interface; creamy emulsion plus about 1 ml of water in bottom of bottles; no change in color. | No change from previous observation | No change from previous observation |
| After hydrocarbon flashing: | Heavy ring of polymer at original vapor-liquid interface; additional polymer visible in vapor areas; haze has disappeared; no emulsion present and water redissolved. | Polymer ring more pronounced at original vapor liquid interface; light film of additional polymer in vapor areas; moderate haze still present; no emulsion present and most of water redissolved. | No change in color or clarity. | |

| | Example 6 | Example 7 | Example 8 |
|---|---|---|---|
| % Hydrocarbon converted to NVSR | 0.017 | 0.077 | 0.046[2] |
| Total % Hydrocarbon converted to Polymer | 0.335 | 0.110[1] | 0.067[2] |
| % Soluble Polymer | 5.1 | 77.1 | 66.6 |
| % Nonsoluble Polymer | 94.9 | 22.9 | 33.4 |

[1]The presence of furfural has been observed to lengthen the induction period for polybutadiene formation, but does not inhibit such formation. After the induction period the rate of polymer formation has been observed as substantially the same as that for MOP alone.

[2]Inhibitor Residue - 0.0313 gms of NPH was dissolved in 5 ml of No. 4 test solution and dried by the NVSR procedure. The residue was less than 0.0001 gms. The added unreacted NPH, therefore, can be neglected in determining NVR's and NVSR's. 0.0311 gms of NPH was dissolved in 2 ml of $H_2O$, transferred to a pressure bottle and capped and evacuated. 15.60 gms of hydrocarbon was added, the mixture shaken for 30 minutes and the NVR determined, using two 5 ml portions of water to wash down the pressure bottle. The NVR was 0.0063 gms. The NPH, therefore, reacts with some components of the hydrocarbon feed to produce nonvolatile product and an adjustment must be made for the reacted product.

The significance of these examples is that there is far less nonsoluble polymer in the MOP — furfural — $H_2O$ system (22.9%) than in the MOP — $H_2O$ system (94.9%), whereas a true inhibitor prevents the formation of the polymer.

The invention claimed is:

1. In a process for the separation of mixtures of $C_4$ paraffin, mono-olefin and diolefin hydrocarbons by a process of extractive distillation comprising contacting said mixtures with a solvent comprising an alkoxynitrile of the formula $R_1$—O—$R_2$—CN where $R_1$ and $R_2$ are alkyl radicals having from 1 to 3 carbon atoms which has preferable solubility for one or more of said hydrocarbons, provided at least, one of said hydrocarbons is dissolved in the solvent and said dissolved hydrocarbon is removed from the extractive distillation zone therein, and at least one other hydrocarbon from said mixture passes from the extractive distillation zone as overhead wherein the improvement comprises reducing fouling by polybutadiene by utilizing as a solvent a mixture consisting essentially of from 70 to 98 weight percent of said alkoxynitrile, from 0.5 to 25 weight percent of furfural and from 1 to 20 weight percent water.

2. The process according to claim 1 wherein said alkoxynitrile is selected from the group consisting of 3-methoxyacetonitrile; 3-ethoxyacetonitrile; 3-propoxyacetonitrile; 3-methoxypropionitrile; 3-ethoxypropionitrile; 3-propoxypropionitrile; 4-methoxybutyronitrile; 4-ethoxybutyronitrile and 4-propoxybutyronitrile and mixtures thereof.

3. The process of claim 1 wherein the said R is a straight chain radical having from 1 to 3 carbon atoms.

4. The process of claim 1 wherein the said alkoxynitrile is 3-ethoxypropionitrile.

5. The process of claim 2 wherein the said alkoxynitrile is 3-methoxypropionitrile.

6. The process of claim 1 wherein the said mixtures of hydrocarbons comprises butadiene-1,3.

7. A process for the extractive distillation of a hydrocarbon mixture comprising principally butadiene, n-butenes and n-butane for the selective extraction of butadiene therefrom comprising contacting said mixture with a solvent comprising 70 to 98 weight percent alkoxynitrile selected from the group consisting of 3-ethoxypropionitrile and 3-methoxypropionitrile, from 1 to 20 weight percent water and from 0.5 to 25 weight percent furfural, dissolving a component comprising predominately butadiene in said solvent and passing off overhead a component comprising predominately n-butane and n-butenes, forming a polybutadiene by-product and dissolving a predominate amount of said by-product in said solvent, and removing said by-product from said extractive distillation in said solvent.

8. The process according to claim 7 wherein the alkoxynitrile is 3-ethoxypropionitrile.

9. The process according to claim 7 wherein the alkoxynitrile is 3-methoxypropionitrile.

10. A process for the extractive distillation of a hydrocarbon mixture comprising principally butadiene, n-butenes and n-butane for the selective extraction of butadiene therefrom comprising contacting said mixture with a solvent comprising 70 to 98 weight percent of an alkoxynitrile of the formula $R_1-O-R_2-CN$ wherein $R_1$ and $R_2$ are alkyl radicals having from 1 to 3 carbon atoms, from 0.5 to 25 weight percent furfural and from 1 to 20 weight percent water, dissolving a component comprising predominately butadiene in said solvent and passing off overhead a component comprising predominately n-butane and n-butene, forming a polybutadiene by-product and dissolving said by-product in said solvent, and removing said by-product from said extractive distillation in said solvent.

* * * * *